(No Model.)
E. WHEELER.
BOX PILE.
No. 361,197.  Patented Apr. 12, 1887.
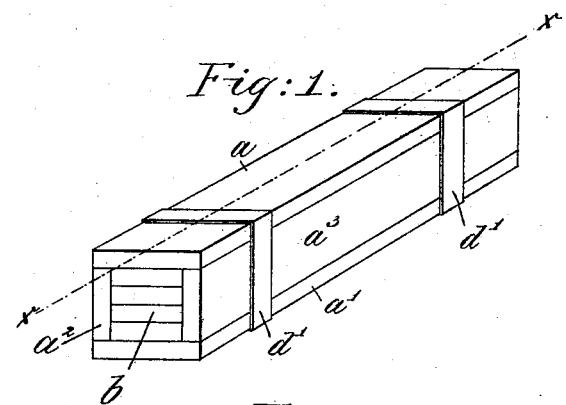
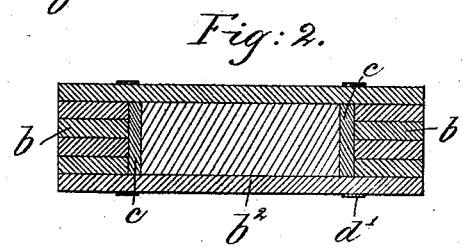
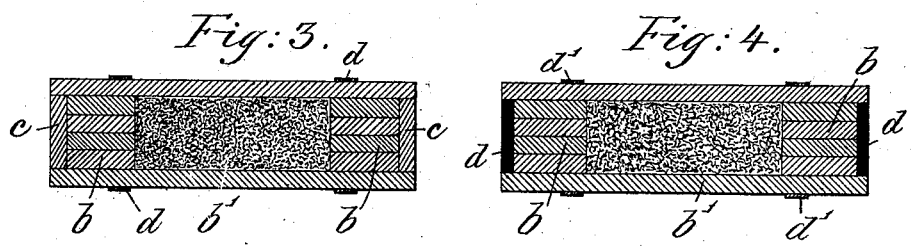
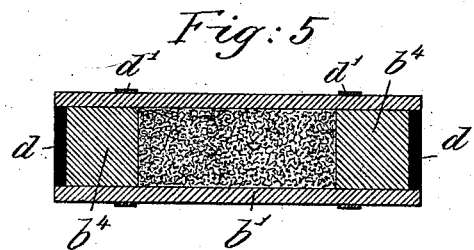
Witnesses.
Arthur Zipperlen.
Fred L. Emery.
Inventor.
Elbridge Wheeler
by Crosby Gregory
attys.
N. PETERS, Photo-Lithographer, Washington, D. C.

UNITED STATES PATENT OFFICE.

ELBRIDGE WHEELER, OF BOSTON, MASS., ASSIGNOR TO HIMSELF, WARE B. GAY, AND GEORGE W. GOGIN, TRUSTEES, ALL OF SAME PLACE.

BOX-PILE.

SPECIFICATION forming part of Letters Patent No. 361,197, dated April 12, 1887.

Application filed April 24, 1886. Serial No. 200,024. (No model.)

*To all whom it may concern:*

Be it known that I, ELBRIDGE WHEELER, of Boston, county of Suffolk, and State of Massachusetts, have invented an Improvement in Box-Piles, of which the following description, in connection with the accompanying drawings, is a specification, like letters on the drawings representing like parts.

This invention has for its object to improve the construction of the box-pile shown and described in United States Patent No. 213,855, granted to me April 1, 1879, my improved box-pile being especially adapted to be used in the manufacture of combined iron and steel.

In accordance with my invention I make the top, sides, and bottom plates of iron, the top and bottom overlapping the side plates. The center of the box-pile will preferably be composed of scrap iron or steel; but it may be a solid pile or bloom, and the ends of the said box-pile will be composed preferably of scrap-iron, which will preferably be in the form of slabs or plates or pieces of old rails; or the said ends may be a solid plug. The scrap to form the ends of the box-pile will preferably be separated from the scrap or solid pile or bloom forming the center of the box-pile by a blinder, each blinder being preferably composed of a single piece or plate made to fit the inside of the box-pile substantially airtight, to prevent the exterior air coming in contact with the scrap or pile or bloom forming the center of the box-pile after the said scrap or pile or bloom has been reduced to a heated condition. The air, if permitted to come in contact with the heated metal forming the center of the box-pile, would oxidize said metal on its surface, and thereby prevent a union between the said metal and the plates forming the top, bottom, and sides of the box-pile.

Figure 1 is a perspective view of a box-pile embodying my invention; Fig. 2, a longitudinal section of Fig. 1 on line $x\ x$; Fig. 3, a modified form of pile, and Figs. 4 and 5 other modifications to be referred to.

The top $a$, bottom $a'$, and side plates, $a^2\ a^3$, of the box-pile are preferably slabs or plates of wrought-iron, the top and bottom overlapping the side plates.

The ends of the box-pile will preferably be composed of slabs of what is known as "muck-iron," as shown at $b$, Figs. 2, 3, and 4, or pieces of old rails; or the said ends may be a solid plug, as shown at $b^4$, Fig. 5.

The center of the box-pile will in most cases consist of metal scrap, preferably iron or steel, as shown at $b'$, Figs. 3, 4, and 5; but instead of scrap the said center may be a solid pile or bloom, $b^2$. (See Fig. 2.)

In order to prevent the exterior air from coming in contact with the interior scrap or pile forming the center of the box-pile, I have placed a blinder, $c$, preferably of metal, between the end slabs, $b$, and the solid pile or bloom; but instead of having the blinder between the scrap or solid center and the end of the box-pile the said blinder may be placed at the extreme end of the box-pile, as shown in Fig. 3.

In some instances it may be desirable to employ non-metallic blinders $d$—such, for instance, as in Figs. 4 and 5, wherein the blinders are composed of clay or other similar or plastic material, it forming a luting and excluding the air.

The box-pile, when completed, will be bound by straps $d'$, or be secured in other equivalent or well-known manner, and when so bound it will be placed in a suitable furnace and heated to proper heat to weld the top, bottom, and sides of the box-pile with the ends, such heat being sufficient to bring the steel-scrap center, when steel-scrap is used, to a semi-fluid condition.

After the box-pile has been raised to the desired heat it will be reduced by rolling, or in other usual manner.

I have herein shown a box-pile composed of top, bottom, and side plates, and having metal ends composed of slabs or plates of metal piled one upon another; but I do not herein claim such parts, as they form the subject of claim in another application, Serial No. 205,224, filed June 15, 1886.

I claim—

1. A box-pile consisting of top, bottom, and side plates and metal ends, combined with blinders, substantially as described, to prevent exterior air from reaching the metal center of the box-pile, substantially as set forth.

2. A box-pile consisting of top, bottom, and side plates and end pieces composed of wrought metal, combined with blinders, substantially as described, to prevent the air from reaching the metal center of the box-pile, substantially as described.

In testimony whereof I have signed my name to this specification in the presence of two subscribing witnesses.

ELBRIDGE WHEELER.

Witnesses:
G. W. GREGORY,
J. H. CHURCHILL.